United States Patent
Oliver et al.

[11] Patent Number: 6,166,329
[45] Date of Patent: Dec. 26, 2000

[54] PROTECTING ELECTRICAL DEVICE ASSEMBLIES DURING INSTALLATION

[75] Inventors: Michael D. Oliver, Plano; Robert A. Procsal, Richardson, both of Tex.

[73] Assignee: America Cable Systems, New Bedford, Mass.

[21] Appl. No.: 09/329,924

[22] Filed: Jun. 10, 1999

[51] Int. Cl.[7] .................................................. H01H 9/02
[52] U.S. Cl. ............................ 174/58; 174/66; 174/67; 220/241; 220/242; 33/528
[58] Field of Search .................... 174/58, 66, 67, 174/48, 50, 53; 220/3.8, 241, 242; 33/528, DIG. 10

[56] References Cited

U.S. PATENT DOCUMENTS

| | | | |
|---|---|---|---|
| 5,486,650 | 1/1996 | Yetter | 174/53 |
| 5,651,696 | 7/1997 | Jennison | 439/536 |
| 5,773,760 | 6/1998 | Stark et al. | 174/66 |
| 5,804,764 | 9/1998 | Gretz | 174/53 |
| 5,828,002 | 10/1998 | Fedun | 174/58 |
| 5,837,933 | 11/1998 | Fligelman | 174/50 |

FOREIGN PATENT DOCUMENTS

| | | | |
|---|---|---|---|
| 2230146 | 10/1990 | United Kingdom | 174/58 |

OTHER PUBLICATIONS

AFC Uni–Fab Division, "Practical Wiring Solutions," Issue No. 3 (Aug. 1998).

*Primary Examiner*—Dean A. Reichard
*Assistant Examiner*—Dhiru R Patel
*Attorney, Agent, or Firm*—Fish & Richardson P.C.

[57] ABSTRACT

An electrical device assembly, for mounting behind a wall surface, includes an electrical device mechanically attached to a mounting plate, and a rigid protector extending over the device to protect the device during wall construction. The hard metal protector enables an uninterrupted sheet of drywall or other wall facing material, hung in place over the device, to be cut through with a saw or router without risk of damaging the device by incidental contact with the cutting blade.

39 Claims, 11 Drawing Sheets

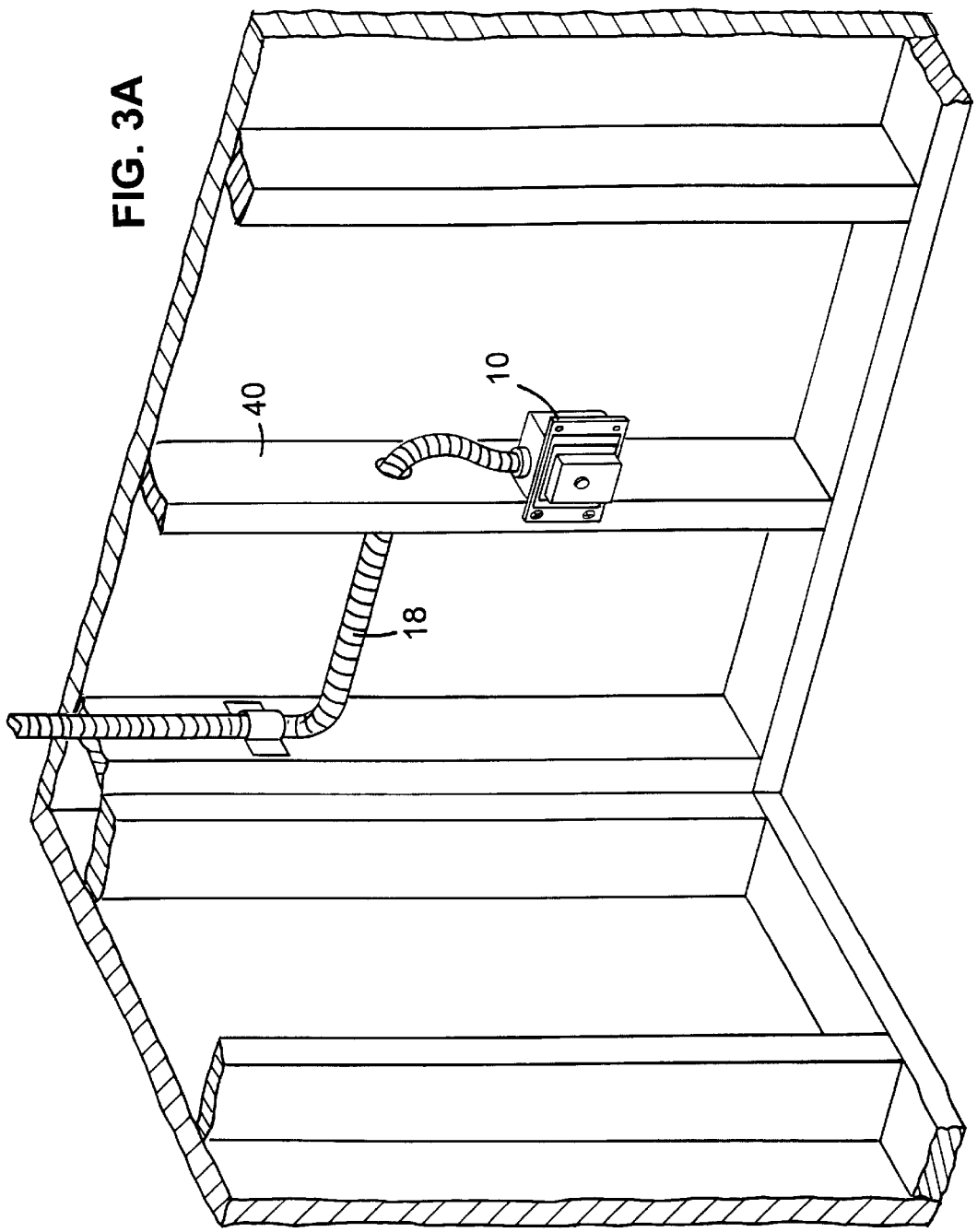

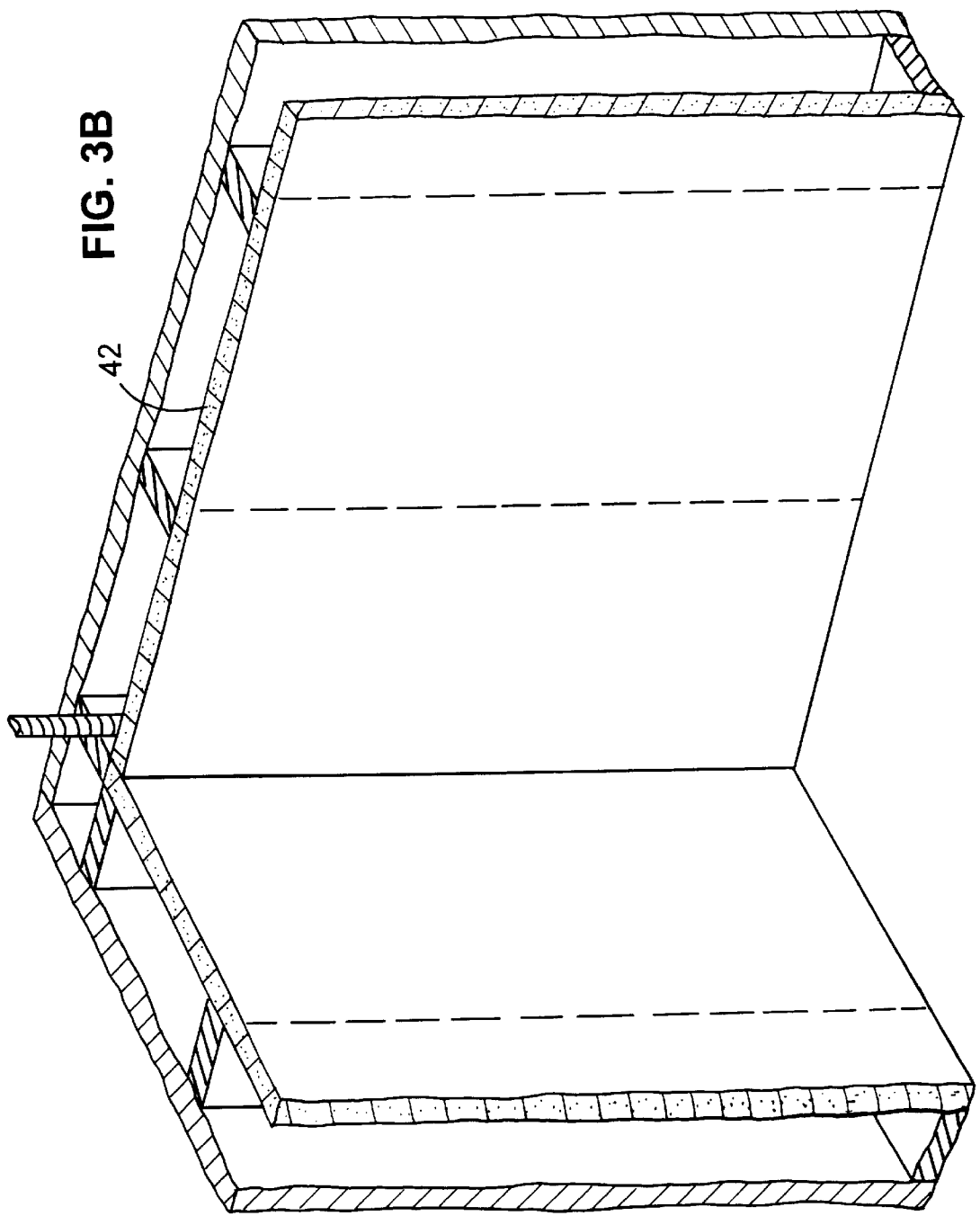

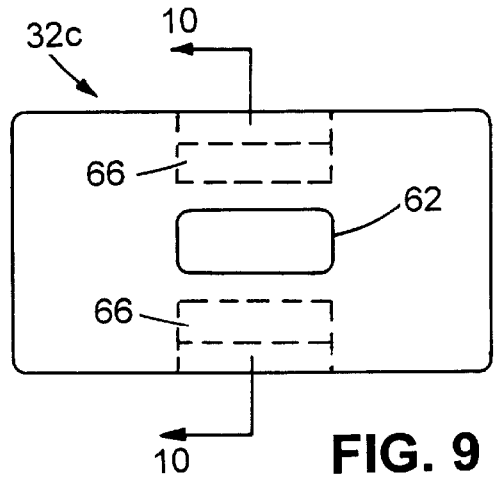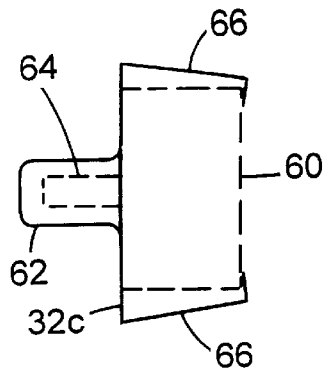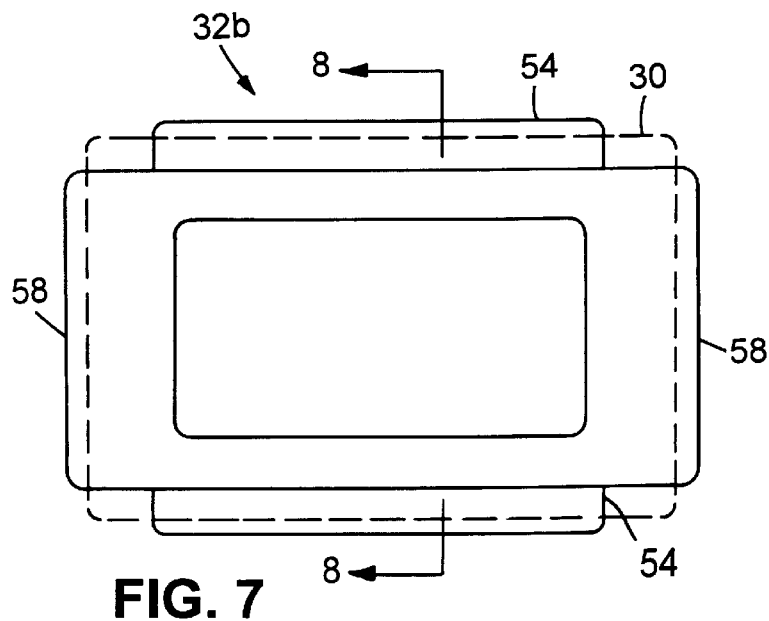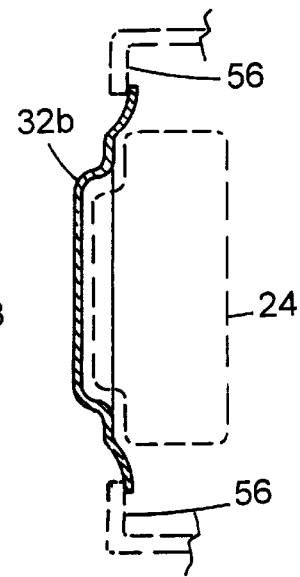

PROTECTING ELECTRICAL DEVICE ASSEMBLIES DURING INSTALLATION

BACKGROUND OF THE INVENTION

This invention relates to protecting electrical device assemblies, such as switches and receptacles, during installation behind wall surfaces, and to methods of finishing walls containing such devices.

To facilitate field installation of wall-mounted electrical devices, such as electrical receptacles and switches, many such devices are now provided as pre-wired assemblies in which the device is mounted and wired within a standard junction box from which wires extend in a conduit whip for connecting the device to the rest of the branch circuit. Thin plastic covers are sometimes taped in place over the devices during assembly to protect against dust and paint during wall trimming.

Such device assemblies are mounted directly to internal wall supports prior to the installation of the wall facing material, such as drywall. Prior to hanging the sheet of drywall about the front of the device, a rectangular hole is cut at a measured location through the drywall to expose the device in the finished wall. Proper positioning of the drywall hole is critical to ensure that the hole will be completely covered by the cover plate installed over the device once the wall has been finished. With the hole cut, the drywall is hung, taped and finished. Once wall finishing and painting are complete, the thin plastic dust cover in place is removed from the device and the cover plate is installed.

Any improvement in the speed with which walls can be safely trimmed out can result in significant job-site cost savings.

SUMMARY OF THE INVENTION

This invention can enable faster wall construction by providing a more robust device assembly constructed to enable cutting the requisite access hole through the wall facing material after the facing material has been mounted without damage to the electrical device or its wiring.

The invention features a removable, rigid protector forming a shield to protect the device during wall construction. By "rigid" we mean that the protector is stiff enough to avoid transferring a sharp impact load of about 10 pounds peak magnitude (such as might be applied by a saw blade during wall cutting) to the protected electrical device. Preferably, the protector is able to withstand light contact with a high speed router bit without being breached.

According to one aspect of the invention, an electrical device assembly to be mounted behind a wall surface includes a mounting plate defining an aperture, an electrical device mechanically attached to the mounting plate and arranged to be accessed through the aperture, and a removable, rigid protector forming a shield across the aperture to protect the device during wall construction.

In presently preferred embodiments, the protector comprises a metal plate.

For many applications, the protector is formed of steel sheet of at least 0.02 inch thickness, and may include a cavity for receiving an extension of the electrical device.

In some embodiments, it is preferred that the outer surface of the protector have a Brinell hardness of at least 120. An outer hardness of more than about 160 Brinell is even more preferred. Many widely available metals, ceramics and composites have acceptable mechanical properties. High temperature resistance, for withstanding contact from a router bit at a temperature of about 1200 degrees Fahrenheit, for instance, is also highly desirable.

The device may comprise an electrical receptacle or an electrical switch, for example, adapted to be coupled to another component of an electrical circuit.

There are various useful means for releasably retaining the protector in position across the aperture. In some embodiments, for instance, the protector is releasably attached to the device by a mechanical fastener extending through a hole in the protector. The mechanical fastener may be threaded to engage mating threads of the device, or may be adapted to be pushed into place during assembly and pulled out to remove the protector from the device. In some cases, the protector is held in place by tape, a frangible strap, a flexible tie strap, or adhesive. Some protectors have side portions extending through the aperture to engage an inner surface of the mounting plate to hold the protector in place across the aperture. Some protectors form a spring clip adapted to hold the protector in place by grasping the device. In some cases, a headed fastener extends through both the device and the protector to attach the device and the protector to the mounting plate. The protector may define a hole for receiving the headed fastener, the hole through the protector having a first portion of sufficient diameter to pass a head of the headed fastener, and a second portion, contiguous with the first portion, of less than sufficient diameter to bass the head of the headed fastener.

In some embodiments, the protector defines a pair of apertures for receiving a retaining strap. The apertures may comprise slots extending through opposite edges of the protector, for example.

In some useful embodiments the electrical device assembly also includes a box attached to the mounting plate and arranged to surround the electrical device.

In some cases, the protector is adapted to provide an indication of a characteristic of the electrical device. For instance, the protector may be color-coded to a list of electrical devices, or may include useful mounting, wiring or safety information.

According to another aspect of the invention, a method of finishing a wall containing an electrical device is provided. The method includes mounting any of the above-described device assemblies to a wall structural member, covering the device assembly with a wall facing material, cutting an opening through the wall facing material to expose the removable protector protecting the electrical device, and then removing the protector to expose the electrical device.

The wall facing material may be drywall, for example.

In some cases, the step of cutting an opening includes cutting through the facing material adjacent the removable protector with a rotating bit.

The step of removing the protector may include releasing a mechanical fastener holding the protector in place across the aperture.

According to another aspect of the invention, a method of forming an electrical device assembly for mounting in a wall is provided. The device assembly including an electrical device mechanically attached to a mounting plate, and a rigid protector extending over the device to protect the device during wall construction. The method includes the steps of attaching the electrical device to the mounting plate to form a pre-assembly, and releasably attaching the protector to the pre-assembly to cover an otherwise exposed face of the electrical device. Usefully, the protector is adapted to protect the electrical device during wall construction.

The invention can enable the advantageous use of high speed cutting tools, such as routers, for cutting the drywall adjacent electrical devices, by adequately protecting the device against the cutting bit, accidental contact with which can cause permanent damage to the device and necessitate replacement and rewiring. By enabling safe post-mounting drywall hole cutting, drywall installation is simplified. With a relatively inexpensive template, the device is readily mounted at a desired height and the hole router is positioned appropriately to cut the access hole through the installed drywall (or other wall facing material) directly in front of the device.

Other features and advantages will be apparent from the following description and drawings, and from the claims.

BRIEF DESCRIPTION OF THE DRAWINGS

FIGS. 3A–3D sequentially illustrate finishing a wall containing the device assembly.

FIG. 7 is a front view of a third device protector.

FIG. 8 is a cross-sectional view taken along line 8—8 in FIG. 7, with device and mounting plate details in dashed outline.

FIG. 9 is a front view of a fourth device protector.

FIG. 10 is a cross-sectional view taken along line 10—10 in FIG. 9, with an attached device in dashed outline.

DESCRIPTION OF EMBODIMENTS

Figure 1:
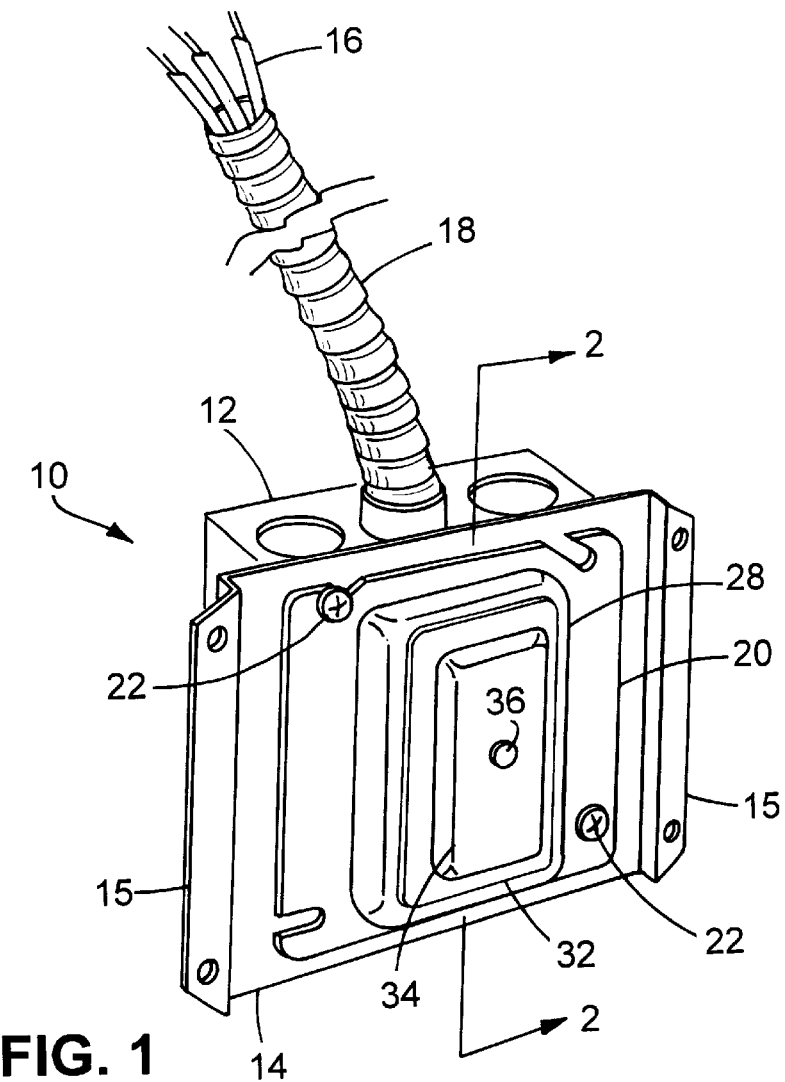
FIG. 1 is a perspective view of a pre-wired electrical device assembly.

Referring to FIG. 1, pre-wired device assembly 10 contains an electrical device, such as an electrical switch or receptacle (outlet), contained within a standard steel mounting box 12 having a face plate 14 with flanges for mounting the assembly to a support. Wires 16 from the enclosed device are sheathed in conduit to form a whip 18 for electrically connecting the device to other components of an electrical circuit. Assembly 10 may be Pre-wired before delivery to the construction site, to be readily attached to a support and hooked up with minimal field electrician's time.

Figure 2A:
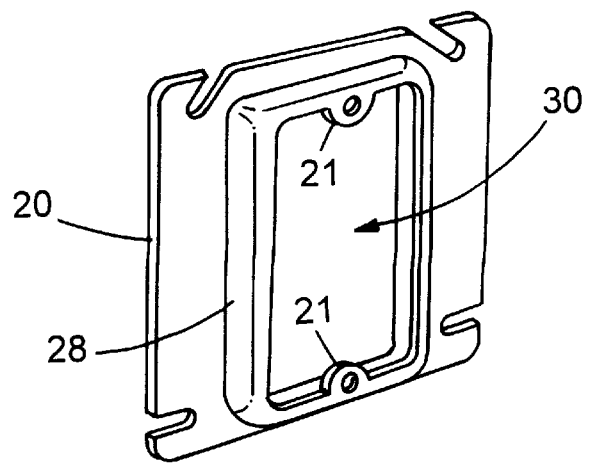
FIG. 2A is a perspective view of a mounting plate.
Figure 2:
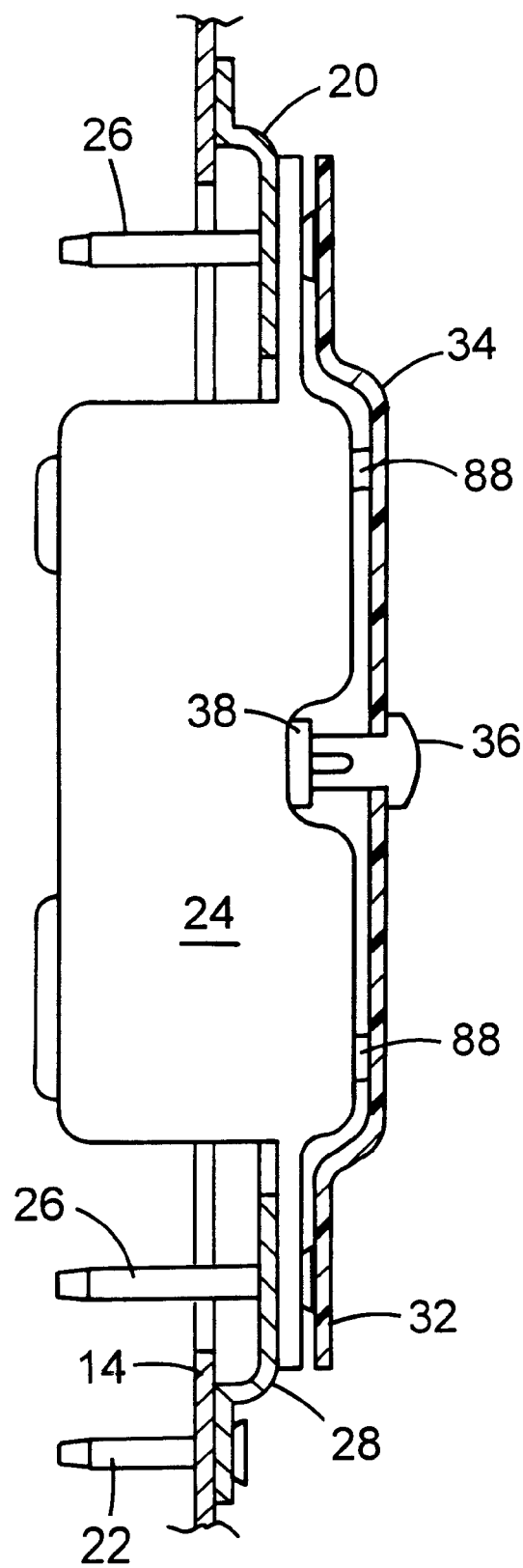
FIG. 2 is a cross-sectional view of the device assembly, taken along line 2—2 in FIG. 1.

Referring also to FIG. 2, assembly 10 includes a device mounting plate 20 which is attached to the face plate 14 of the mounting box with screws 22 and provides proper mounting features for supporting and retaining the electrical device 24. Various configurations of mounting plates 20 are commercially available for mounting different types of devices. Some mounting plates and boxes simultaneously accommodate multiple devices arranged side-by-side.

Referring to FIG. 2A, mounting plate 20 is typically provided with threaded holes 21 or clips to receive threaded screws 26 (FIG. 2) for retaining the device. Made of stamped steel, some mounting plates have a raised area 28, as shown, to extend the face of the device a given distance from the face of the mounting box, such that the device will be properly positioned with respect to the surrounding wall surface in the finished wall. An aperture 30 through the mounting plate provides clearance for the body of the device, for installing and removing the device from the front of the mounting plate. The mounting plate may be provided with flanges or other features to directly attach to wall support structure, or may itself be an integral member of the mounting box.

Referring back to FIGS. 1 and 2, assembly 10 is also provided with a rigid device protector 32 that extends across the aperture of mounting plate 20 to protect the device during shipping, installation and wall trimming. Protector 32 is preferably made of stamped, low-carbon steel of at least 0.02 inch (25 gage) thickness and coated with zinc to resist corrosion. Ideally, the protector is able to withstand incidental contact with a high speed router bit, which can exceed temperatures of 1200 degrees Fahrenheit. A presently preferred protector is of 22 gage (0.03 inch thick) stamped steel, but some softer metals and even some high strength plastics are useful in greater thicknesses for some applications. However, ductile metals with a Brinell hardness of at least 120 are preferred for protection against high speed bits. Several protector configurations are discussed below with respect to other figures. Protector 32 shown in FIGS. 1 and 2 is stamped to form a large rectangular raised area 34 for accommodating a duplex receptacle or a block-type device. Block-type devices include rocker switches and GFI outlets, for example. Raised area 34 extends over the face of the device and provides a protective shield against device damage. A fastener 36 retains the protector to the rest of assembly 10. In this case, fastener 36 is a push-type fastener which is inserted through a central hole in protector 32 into a threaded boss 38 of duplex receptacle device 24, and is intended to be removed and discarded, along with protector 32, at the construction site. Other types of mechanical fasteners are also envisioned, examples of which are discussed below and shown in FIGS. 17A–17D.

Figure 3C:
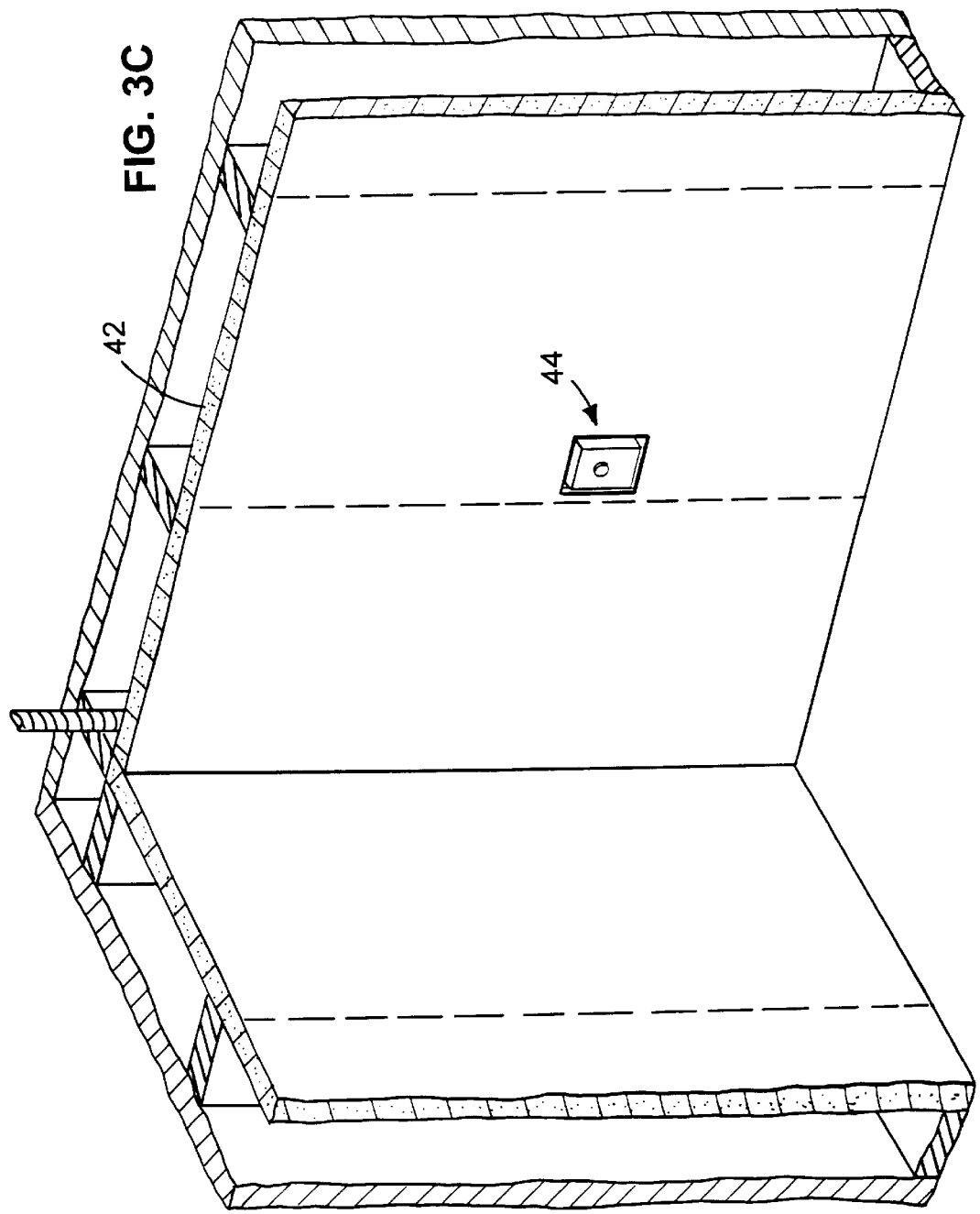
Figure 3D:
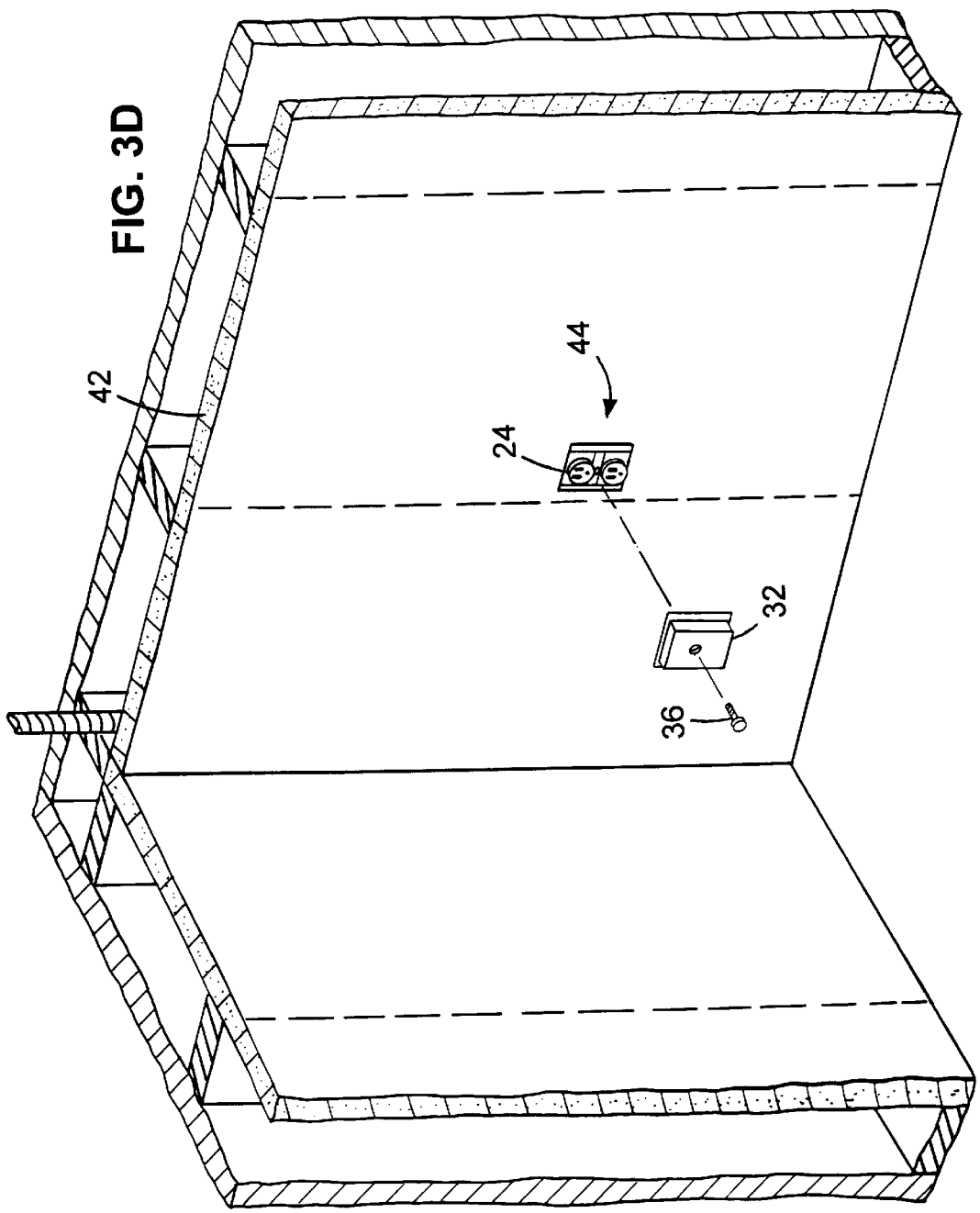

FIGS. 3A–3D illustrate the completion of an interior wall containing device assembly 10, mounted to a vertical wall stud 40. Although solid wooden studs are shown, commonly stamped metal stud members are employed in commercial construction. In FIG. 3A, device assembly 10 is shown already mounted, with its conduit whip 18 routed through stud 40 and connected to circuit wiring (not shown). Care is taken to record the mounted location of the device assembly. A simple mounting template (not shown) is useful for installing the device assembly at a desired height from the floor, and floor markers (not shown) may be employed to indicate horizontal device positioning.

After all device assemblies to be mounted within the wall are in place and wiring completed, the drywall 42 or other wall facing material is hung (FIG. 3B). Either one face of each wall may be hung prior to mounting the electrical device assemblies (as shown), or both faces may be hung after the electrician's work is done. The drywall crew is able to quickly complete their work, as they need not stop to measure and cut openings for electrical switches and outlets while hanging. The hung drywall is taped and sanded while the electrical devices are safely shielded from sanding dust and drywall mud behind the wall surface. Painting may even be completed at this time, with the drywall protecting the electrical devices from paint splatter.

Only after the drywall 42 is hung in place are the electrical device openings 44 cut through the drywall (FIG. 3C). The location for each opening 44 is readily determined with the aid of floor markings and the same template employed to mount the electrical devices. With the device protector in place, a saw or router (not shown) may be safely used to cut openings 44 without fear of the metal saw blade or router bit accidentally contacting and destroying the electrical device or its wiring.

Final trim-out of the electrical devices entails simply removing and discarding protector 32 and its fastening means (FIG. 3D), and installing a standard device trim plate (not shown) to cover the hole 44 in the wall facing material.

Many different configurations of protector 32 are envisioned. FIGS. 4–16 illustrate samples of useful configurations. It will be understood that the various protector features of the individual examples shown may be combined in several different arrangements.

Figure 4:
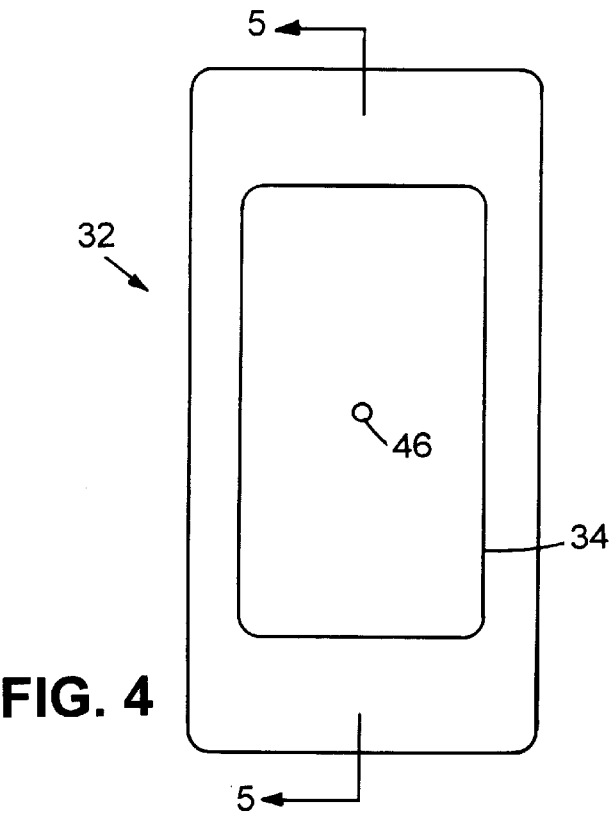
FIG. 4 is a front view of a first device protector.
Figure 5:
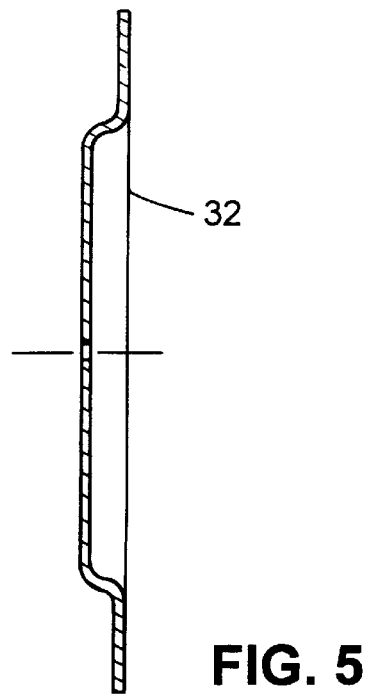
FIG. 5 is a cross-sectional view, taken along line 5—5 in FIG. 4.

FIGS. 4 and 5 illustrate the protector 32 as shown in the device assembly of FIGS. 1 and 2. The protector has overall face dimensions of about 2 by 4 inches. It defines a central hole 46 for receiving a mechanical fastener, and has a broad, flat raised area 34 (of about 1.4 by 2.7 inches) for extending across the face of a duplex receptacle or block-type device. The raised area extends about 0.2 inch from the face of the protector, and is sufficiently broad and flat to carry a manufacturer's logo or device installation instructions (e.g., color coding), which may be formed into the surface of the protector or applied as ink or decal.

Figure 6:
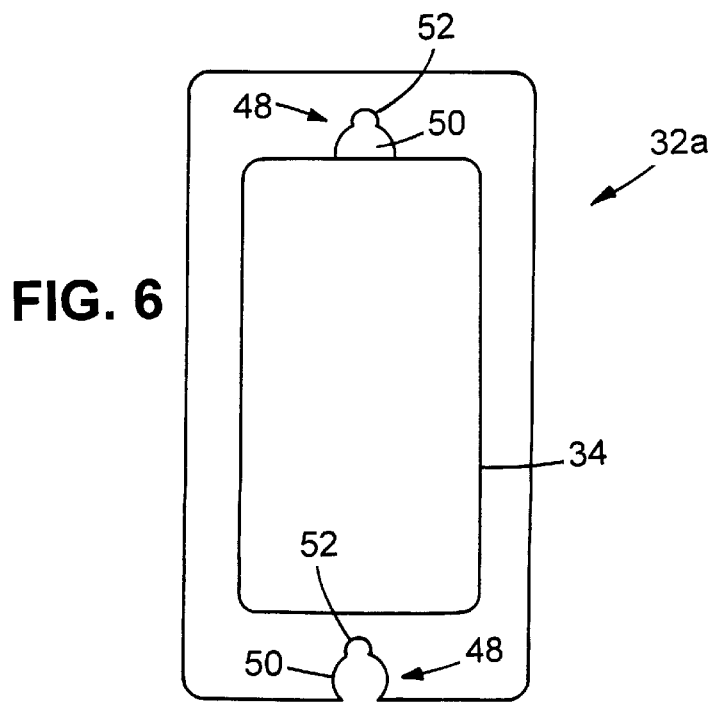
FIG. 6 is a front view of a second device protector.

The protector 32a of FIG. 6 is for use with block-type devices without central face attachment means. Holes 48 are provided at each end of the protector, for receiving the threaded fasteners 26 holding the device to the mounting plate (FIG. 2). Each hole 48 has a wide area 50 broad enough to fit over the head of the fastener. The protector is then slid downward until the shanks of the fasteners are within the narrow regions 52 of holes 48, and the fasteners are tightened. Protector 32a is removed in the field by loosening the device fasteners, sliding the protector off, and then re-tightening the device fasteners before installing device trim.

The protector 32b of FIGS. 7 and 8 requires no separate mechanical fasteners. It is provided with wings 54 extending from opposite edges of the protector, that extend through the aperture 30 of the mounting plate and engage inner surfaces 56 of the mounting plate to retain the protector in place over the device. Flexure of wings 54 maintains pressure between the mounting plate and the protector wings. The protector may otherwise bear against the face of the device, or opposite edges 58 may bear against the outer surface of the mounting plate. To install protector 32b, one wing 54 is first inserted through aperture 30 and under a corresponding edge of the mounting plate, with the protector skewed toward the inserted wing. The exposed wing 54 is then flexed and inserted beneath the opposite edge of the mounting plate aperture, and the protector is centered across the aperture. This process is reversed to remove the protector at the job site.

Protector 32c of FIGS. 9 and 10 is configured for use with a standard wall switch 60, and has a narrow raised area 62 forming a rectangular pocket 62 to receive the switch lever 64. Protector 32c is made of thin spring steel and is held in place by spring arms 66 integrally formed with and extending from the protector to engage the back face of the switch body. To install protector 32c, spring arms 66 are elastically splayed outward and snapped about the back of the switch body as the protector is moved into place. The protector is readily removed by simply grasping and pulling on its raised area 62.

Figure 11:
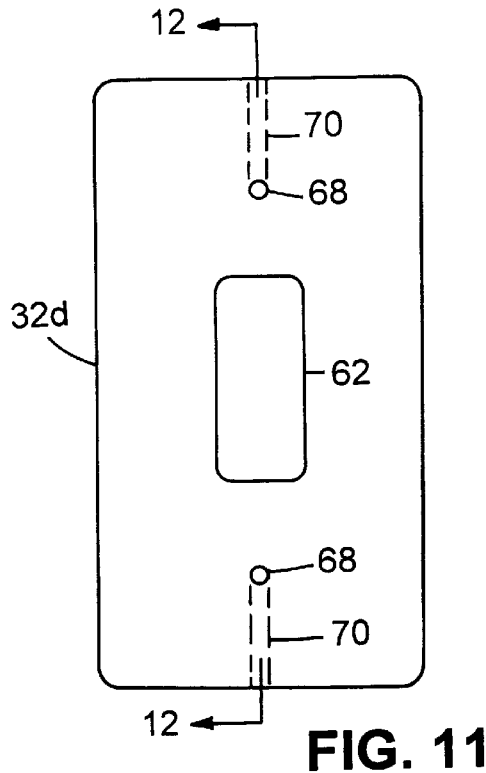
FIG. 11 is a front view of a fifth device protector.
Figure 12:
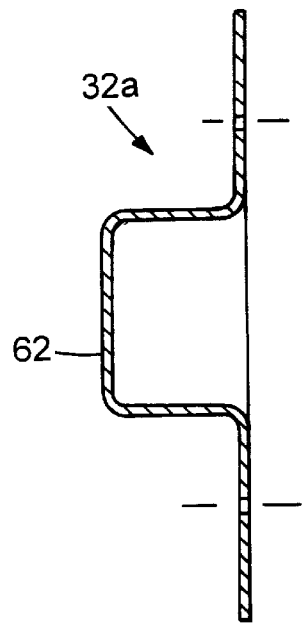
FIG. 12 is a cross-sectional view taken along line 12—12 in FIG. 11.

The switch protector 32d of FIGS. 11 and 12 is configured to be retained by the fasteners mounting the switch to the mounting plate. It may be provided with a pair of spaced apart holes 68, as shown, or a pair of slots 70 (shown in dashed outline). Slots 70, which extend through edges of the protector, are useful for accommodating switch devices having various mounting screw spacings.

Figure 13:
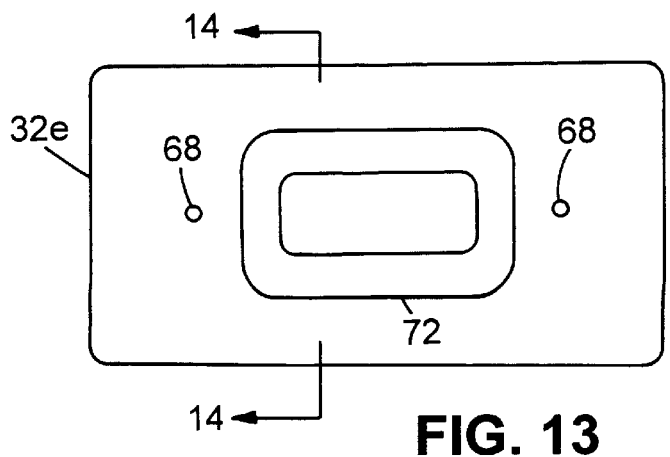
FIG. 13 is a front view of a sixth device protector.
Figure 14:
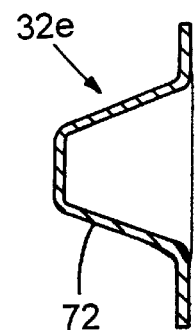
FIG. 14 is a cross-sectional view taken along line 14—14 in FIG. 13.

The raised regions for accommodating switch levers or device faces may be formed in many shapes. FIGS. 13 and 14 illustrate a switch protector 32e having a trapezoidal raised area 72 with large drawing draft angles.

Figure 16:
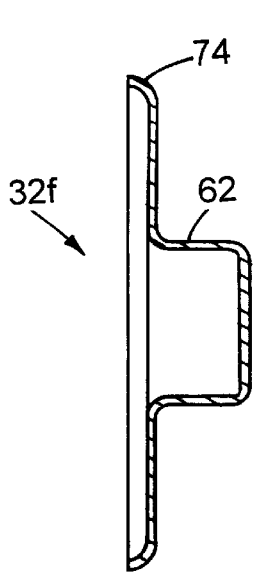
FIG. 16 is a cross-sectional view taken along line 16—16 in FIG. 15.
Figure 15:
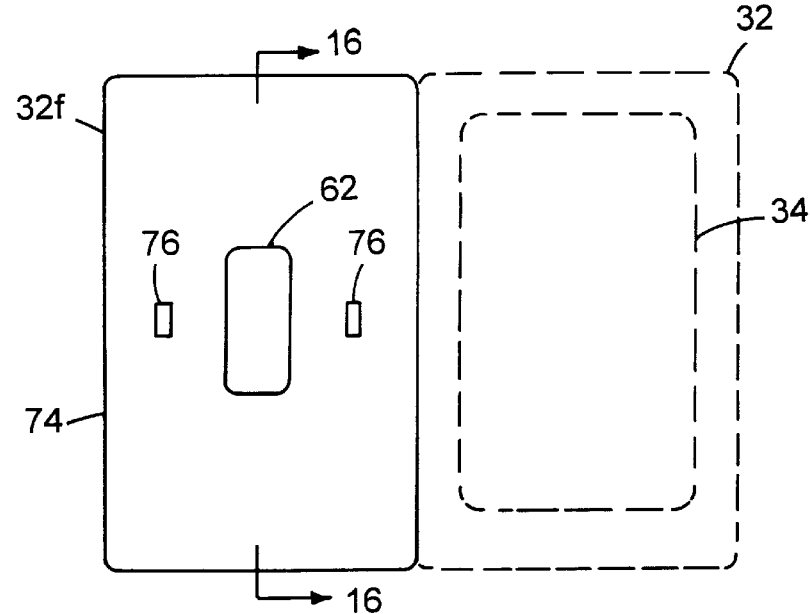
FIG. 15 is a front view of a seventh device protector.

The switch protector 32f of FIGS. 15 and 16 is stamped to have edges that extend down over the edges of a raised region 28 of a mounting plate (FIG. 2A), thereby helping to prevent dust and paint spray from entering the device assembly between the face of the mounting plate and the back of the protector. Protector 32f extends across the entire aperture of the mounting plate, and is particularly useful in dusty environments. Two rectangular holes 76 through the protector on either side of the switch lever housing 62 are sized to receive a standard plastic tie strap for strapping the protector to the device.

The protectors discussed above may be conveniently ganged to protect multiple devices in the same device assembly. For instance, a receptacle protector 32 is shown in dashed outline in FIG. 15, ganged with a switch protector 32f. Adjacent protectors are preferably overlapped.

Figure 17A:
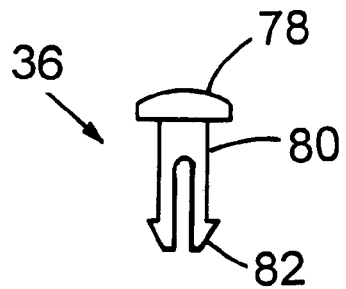
FIGS. 17A–17D illustrate four types of mechanical fasteners for releasably retaining the protectors in place.
Figure 17B:
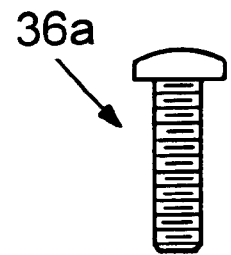
Figure 17C:
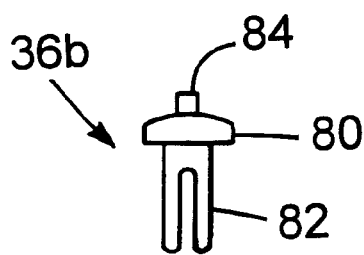
Figure 17D:
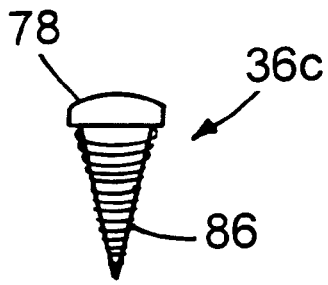

FIGS. 17A–17D illustrate examples of types of mechanical fasteners useful for retaining device protectors to device assemblies. FIG. 17A shows a plastic push pin fastener 36 having a head 78 and a pair of extending fingers 80 with distal barbs 82. Pin fastener 36 is pressed into a threaded hole of the device assembly to hold the protector in place, and is removed by prying it out of its hole, either directly or by lifting an edge of the protector. Barbs 82 are configured to grip threads when fingers 80 are flexed inward as the fastener is inserted. FIG. 17B shows a standard threaded screw 36a which is adapted to be torqued with a standard screwdriver. The male threads of screw 36a engage female threads on the device assembly to retain the protector. FIG. 17C shows a two-part push pin 36b. The molded plastic body of the push pin has a head 80 and extending fingers 82 which are inserted into a threaded hole of the device assembly. Once inserted, an inner piston 84 extending through head 80 is permanently pushed down between fingers 82 to splay the fingers outward to press against the female threads of the hole. Pin 36b is removed like pin 36, by prying. FIG. 17D shows a mechanical fastener 36c having a tapered male thread 86 or other tapered gripping element, which is pressed into a threaded hole. Thread 86 may be formed of molded plastic, for instance, which deforms when inserted and locks the fastener in place. The fastener is removed either by twisting, or by prying or pulling. Other types of mechanical fasteners, such as those commonly known as "Christmas tree"-type fasteners, may also be employed.

Figure 18:
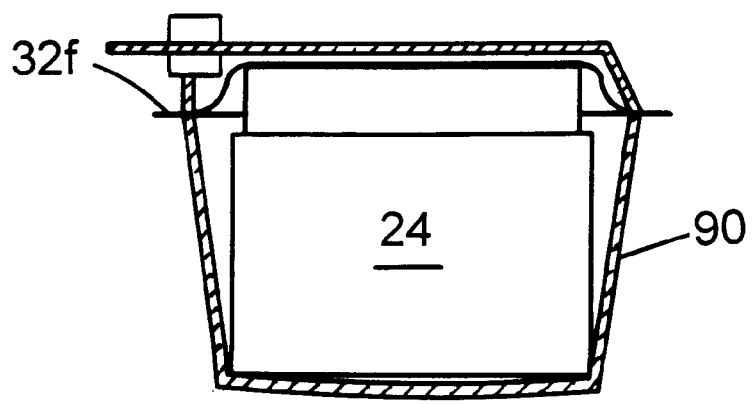
FIG. 18 shows a protector strapped to a device with a plastic tie strap.

The device protector may be temporarily retained by other fastening means. For instance, it and a device may be wrapped with tape. Adhesive 88, hot-melt glue or double-sided tape may be employed to releasably adhere the protector to the device (FIG. 2). As mentioned above with respect to FIG. 16, and shown in FIG. 18, a plastic tie strap 90 may be wrapped about the protector and device and later clipped for removal. Flexible twist-ties, similar to those commonly used as bread loaf bag closures, may be employed.

There are yet other embodiments which will be found to be within the scope of the following claims.

What is claimed is:

1. An electrical device assembly to be mounted in a wall prior to installation of a wall facing material, the assembly comprising a mounting plate defining an aperture therethrough;

an electrical device mechanically attached to the mounting plate and arranged to be accessed through the aperture; and a removable, rigid protector forming a shield across the aperture to protect the entire electrical device during installation of the wall facing material, the protector adapted to be removed after installation of the wall facing material to expose the electrical device.

2. The electrical device assembly of claim 1 wherein the protector comprises a metal plate.

3. The electrical device assembly of claim 1 wherein the protector is formed of steel sheet of at least 0.02 inch thickness.

4. The electrical device assembly of claim 1 wherein the protector includes a cavity for receiving an extension of the electrical device.

5. The electrical device assembly of claim 1 wherein the electrical device comprises an electrical receptacle.

6. The electrical device assembly of claim 1 wherein the electrical device comprises an electrical switch.

7. The electrical device assembly of claim 1 wherein the protector is releasably attached to the electrical device by a mechanical fastener extending through a hole in the protector.

8. The electrical device assembly of claim 7 wherein the mechanical fastener is threaded and engages mating threads of the electrical device.

9. The electrical device assembly of claim 7 wherein the mechanical fastener is adapted to be pushed into place during assembly and pulled out to remove the protector from the electrical device.

10. The electrical device assembly of claim 1 wherein the protector is held in place by tape.

11. The electrical device assembly of claim 1 wherein the protector is held in place by a frangible strap.

12. The electrical device assembly of claim 1 wherein the protector is held in place by a flexible tie strap.

13. The electrical device assembly of claim 1 wherein the protector is held in place by adhesive.

14. The electrical device assembly of claim 1 wherein the protector has side portions extending through the aperture to engage an inner surface of the mounting plate to hold the protector in place across the aperture.

15. The electrical device assembly of claim 1 wherein the protector forms a spring clip adapted to hold the protector in place by grasping the electrical device.

16. The electrical device assembly of claim 1 comprising a headed fastener extending through both the electrical device and the protector to attach the electrical device and the protector to the mounting plate.

17. The electrical device assembly of claim 16 wherein the protector defines a hole for receiving the headed fastener, the hole through the protector having a first portion of sufficient diameter to pass a head of the headed fastener, and a second portion, contiguous with the first portion, of less than sufficient diameter to bass the head of the headed fastener.

18. The electrical device assembly of claim 1 wherein the protector defines a pair of apertures for receiving a retaining strap.

19. The electrical device assembly of claim 18 wherein the apertures comprise slots extending through opposite edges of the protector.

20. The electrical device assembly of claim 1 further comprising a box attached to the mounting plate and arranged to surround the electrical device.

21. The electrical device assembly of claim 1 wherein the protector has an outer surface with a Brinell hardness of at least 120.

22. The electrical device assembly of claim 1 wherein the protector is adapted to provide an indication of a characteristic of the electrical device.

23. The electrical device assembly of claim 22 wherein the protector is color-coded to a list of electrical devices.

24. A pre-wired electrical device assembly to be mounted in a wall prior to installation of a wall facing material, the assembly comprising a mounting plate defining an aperture therethrough;

an electrical device mechanically attached to the mounting plate and arranged to be accessed through the aperture, the electrical device adapted to be coupled to another component of an electrical circuit;

a rigid protector disposed across the aperture to protect the electrical device during installation of the wall facing material and adapted to be removed after installation of the wall facing material to expose the electrical device; and means for releasably retaining the protector in position across the aperture.

25. A method of finishing a wall containing an electrical device, the method comprising mounting the device assembly of claim 1 to a wall structural member;

covering the device assembly with a wall facing material;

cutting an opening through the wall facing material to expose the removable protector protecting the electrical device; and removing the protector to expose the electrical device.

26. The method of claim 25 wherein the wall facing material comprises drywall.

27. The method of claim 25 wherein the step of cutting an opening comprises cutting through the facing material adjacent the removable protector with a rotating bit.

28. The method of claim 25 wherein the step of removing the protector comprises releasing a mechanical fastener holding the protector in place across the aperture.

29. A method of forming an electrical device assembly for mounting in a wall prior to installation of a wall facing material, the device assembly including an electrical device mechanically attached to a mounting plate, and a rigid protector extending over the device to protect the device during installation of the wall facing material, the method comprising:

attaching the electrical device to the mounting plate to form a pre-assembly; and releasably attaching the protector to the pre-assembly to cover an otherwise exposed face of the electrical device, the protector adapted to protect the entire electrical device during installation of the wall facing material and to be removed after installation of the wall facing material to expose the electrical device.

30. An electrical device assembly to be mounted behind a wall surface, the assembly comprising
    a mounting plate defining an aperture therethrough;
    an electrical device mechanically attached to the mounting plate and arranged to be accessed through the aperture; and
    a removable, rigid protector forming a shield across the aperture to protect the electrical device during wall construction, the protector having an outer surface with a Brinell hardness of at least 120.

31. The electrical device assembly of claim 30 wherein the electrical device comprises an electrical receptacle.

32. The electrical device assembly of claim 30 wherein the electrical device comprises an electrical switch.

33. The electrical device assembly of claim 30 wherein the protector is releasably attached to the device by a mechanical fastener extending through a hole in the protector.

34. The electrical device assembly of claim 30 wherein the protector is held in place by tape.

35. The electrical device assembly of claim 30 wherein the protector is held in place by a frangible strap.

36. The electrical device assembly of claim 30 comprising a headed fastener extending through both the electrical device and the protector to attach the device and the protector to the mounting plate.

37. The electrical device assembly of claim 30 wherein the protector defines a pair of apertures for receiving a retaining strap.

38. The electrical device assembly of claim 30 further comprising a box attached to the mounting plate and arranged to surround the electrical device.

39. The electrical device assembly of claim 30 wherein the protector is adapted to provide an indication of a characteristic of the electrical device.

* * * * *